United States Patent [19]

Kinoshita

[11] 3,852,940

[45] Dec. 10, 1974

[54] AUTOMATIC CAP SEALING DEVICE

[75] Inventor: Yoshikuni Kinoshita, Tokyo, Japan

[73] Assignee: Ryohsei Plastic Industry Co., Ltd., Tokyo, Japan

[22] Filed: May 17, 1973

[21] Appl. No.: 361,441

[30] Foreign Application Priority Data

May 30, 1972 Japan.............................. 47-053576

[52] U.S. Cl..................................... 53/292, 53/295
[51] Int. Cl............................ B67b 5/00, B65b 7/28
[58] Field of Search ............ 53/128, 196, 291, 292, 53/295; 29/208 B, 235

[56] References Cited
UNITED STATES PATENTS

| | | | |
|---|---|---|---|
| 1,962,481 | 6/1934 | Clark .................. | 53/292 X |
| 2,579,458 | 12/1951 | Allen et al. ............ | 53/292 |
| 2,760,321 | 8/1956 | Greer et al............. | 53/292 |
| 2,771,725 | 11/1956 | Carter.................. | 53/292 X |
| 2,826,884 | 3/1958 | Eddison et al. ......... | 53/295 |

Primary Examiner—Robert L. Spruill
Attorney, Agent, or Firm—Cushman, Darby & Cushman

[57] ABSTRACT

An automatic cap sealing device for applying tubular element of thermally contractive synthetic resin to the capped mouth portion of bottles by supplying a tubular element in flatly pressed and stacked condition, comprising means to take up the tubular elements by holding the same by vacuum adhesion, means to open each flatly pressed tubular element by holding the opposite layers thereof by separate suction port means, guide rod means to be inserted into the opened tubular element, and pushing means to push the tubular element out of the guide rod means onto the capped mouth portion of a bottle brought in alignment with the guide rod means, wherein all of said means are synchronously driven by a common prime mover and are sequentially controlled by cam means in the periodic operation thereof.

2 Claims, 15 Drawing Figures 3,852,940

AUTOMATIC CAP SEALING DEVICE

BACKGROUND OF THE INVENTION

1. Field of the Invention

This invention relates to an automatic cap sealing device, and more particularly a device for automatically supplying sealing means made of thermally contractive synthetic resin around capped mouth portions of bottles.

2. Description of the prior art

It is known to provide sealing means around capped mouth portions of bottles to improve sealing performance of the caps as well as to hold the caps firmly in their clamped positions, said sealing means being made of thermally contractive synthetic resin and adapted to be firmly fixed around the capped mouth portions of bottles by being thermally contracted.

Such sealing means are generally first prepared as tubular elements of thermally contractive synthetic resin adapted to be loosely mounted around the capped mouth portions of the bottles, and thereafter the tubular elements are heated by proper heating means such as in a heating furnace to thermally contract and shrink firmly around the capped mouth portions of the bottles.

Conventionally, the process of mounting the tubular element of thermally contractive synthetic resin loosely around the capped mouth portion of the bottles is often done manually.

In this case, there is of course a problem of low efficiency and low productivity, and in addition, there is a problem that the tubular elements are not always applied correctly to the desired position of the bottles.

SUMMARY OF THE INVENTION

Therefore, it is an object of this invention to provide a device to operate fully automatically to apply sealing means of thermally contractive synthetic resin to the capped mouth portion of the bottles.

A further object of this invention is to provide an automatic capped sealing device of the above mentioned kind adapted to operate upon mechanical and pneumtic principles.

The above mentioned objects are accomplished, according to this invention, by an automatic cap sealing device comprising means for supplying tubular elements of thermally contractive synthetic resin in a flatly pressed and stacked condition, a vacuum adhesive star rotor to take up each one of said tubular elements by suction and transfer the same, means for conveying bottles in series along the path including an arcuate path portion, a plurality of tubular element handling means arranged around a rotary shaft and adapted to be moved along the circular path coinciding with said arcuate path portion in a region thereof, said tubular element handling means each including a pair of vacuum adhesion fingers adapted to receive said tubular elements from said star rotor to open said flatly pressed tubular elements, a guide rod to be inserted into the openings of the tubular elements and a pushing means to push said tubular elements out of said guide rod toward the cap mouth portions of bottle aligned with said guide rod.

BRIEF DESCRIPTION OF THE DRAWING

In the accompanied drawing.

DESCRIPTION OF THE PREFERRED EMBODIMENTS

In the following, this invention will be described in more detail, presenting a preferred embodiment with reference to the accompanied drawings.

Figure 1:
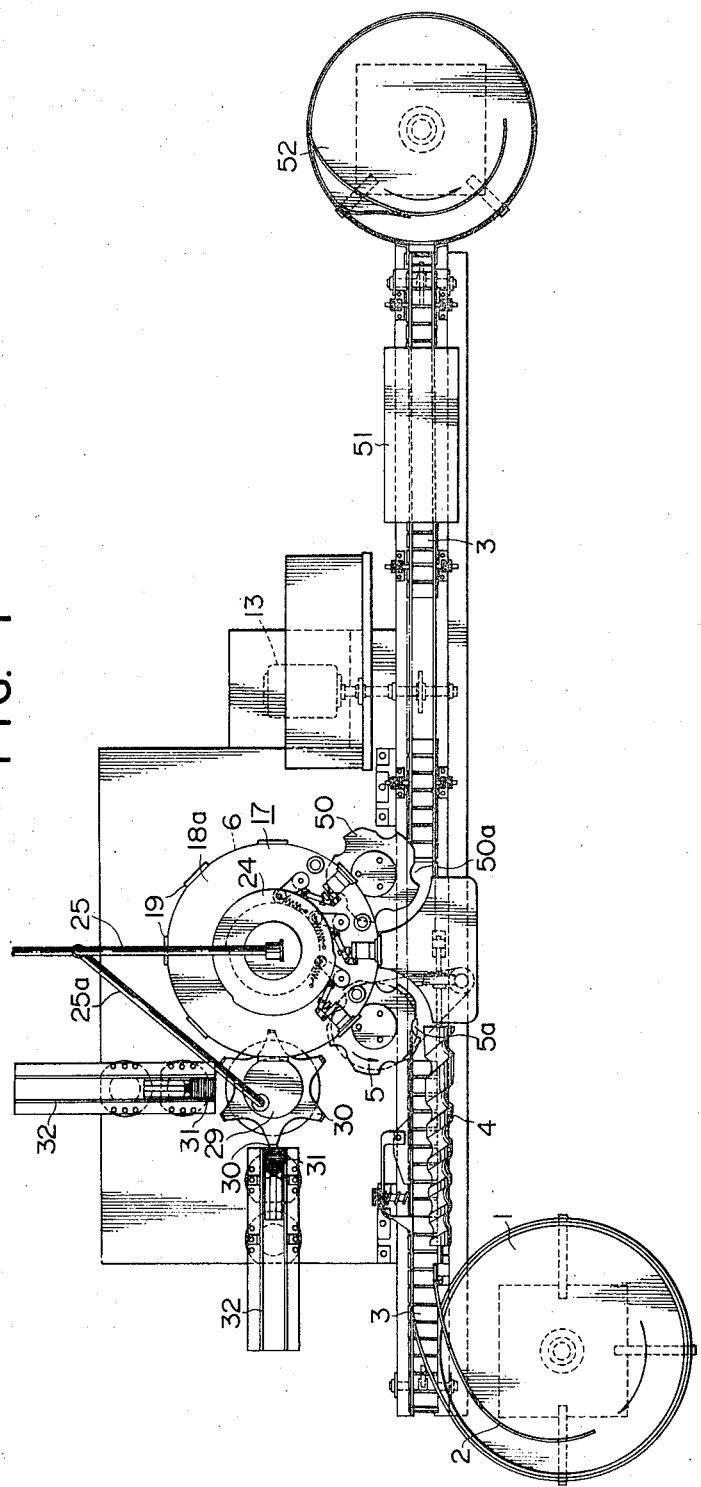
FIG. 1 is a plan view of an embodiment of the automatic cap sealing device according to this invention.
Figure 2:
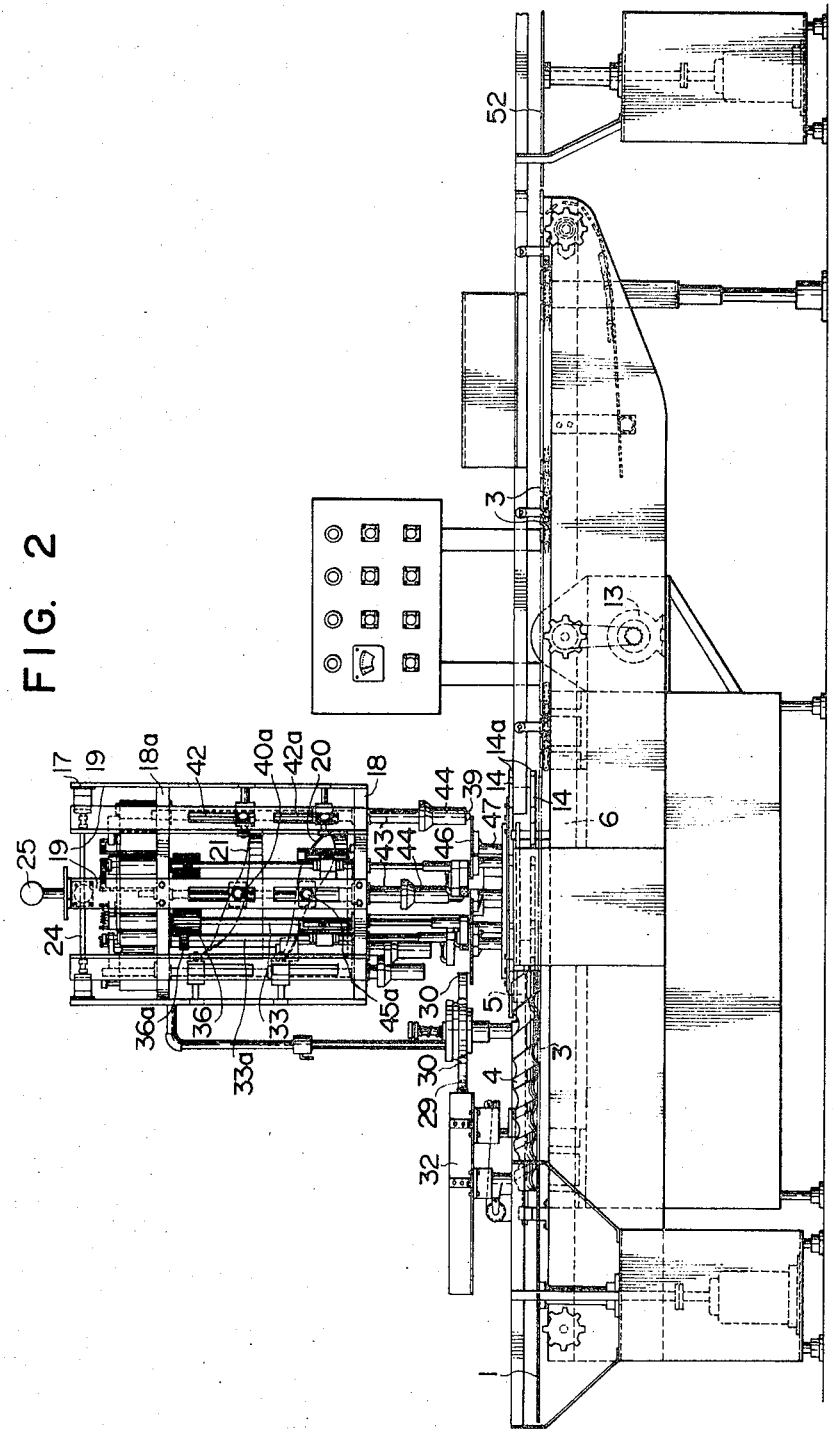
FIG. 2 is an elevational view of the device shown in FIG. 1.

Referring first to FIGS. 1 and 2, bottles mounted with caps at their mouth portions are supplied onto a rotary table 1 in upright self-standing manner. As the rotary table 1 rotates continuously bottles are guided by a guide plate 2 and are moved onto a conveyor 3 one by one in series.

Then, the bottles standing upright on the conveyer 3 are properly spaced by a screw shaft 4, and thereafter are caught by each notch 5a of a feed rotor 5 and fed onto a rotary table 6 one by one with a predetermined spacing.

Figure 3:
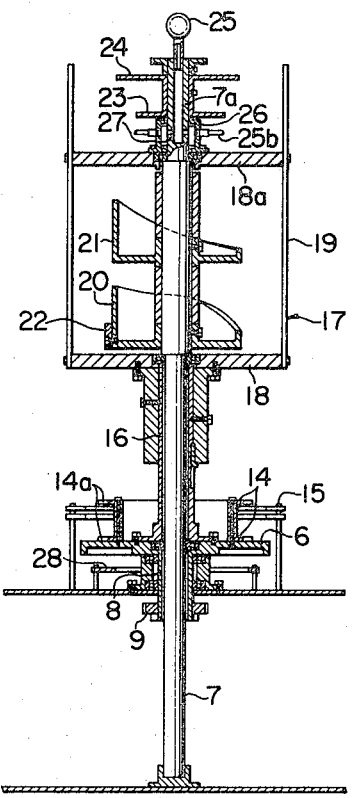
FIG. 3 is a vertical section of a part of the device shown in FIG. 1, particularly showing the structure around the rotary shaft.
Figure 4:
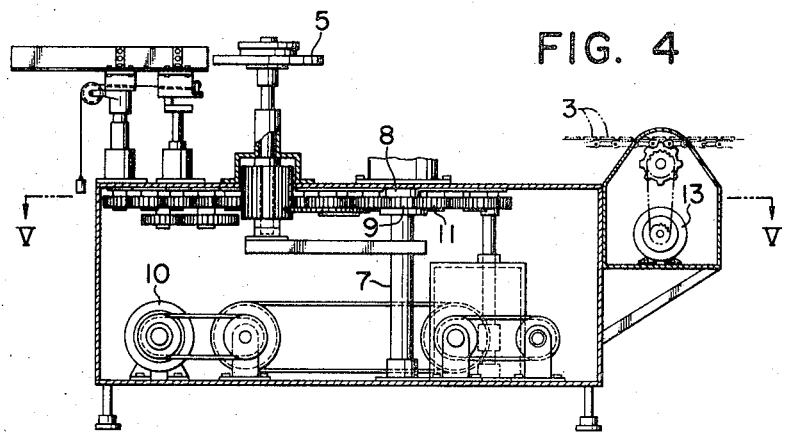
FIG. 4 is an elevational view of a driving mechanism incorporated in the device shown in FIGS. 1 and 2.

As shown in FIG. 3 the rotary table 6 is mounted to a shaft 7 of by way of sleeve 8 and is driven around the shaft 7 by a gear 9 mounted to the sleeve 8 being driven by an electric motor 10 via a gear 11.

Figure 5:
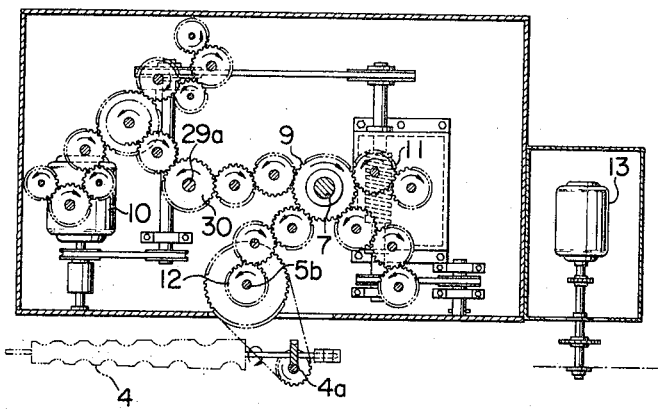
FIG. 5 is a plan view of the driving mechanism along line V—V in FIG. 4.

The feed rotor 5 is also driven by the electric motor 10 by way of gear train including a gear 12 which is mounted to a shaft 5b of the feed rotor (FIG. 5).

The screw shaft 4 is also driven by the electric motor 10 by way of worm reduction gears 4a.

However the conveyer 3 is driven by another electric motor 13.

The rotary table 6 includes upper and lower plates 14, each of which is formed with notches 14a along its periphery to receive bottles one by one. The rotary table 6 is protected by a circular protecting frame 15.

Around the fixed shaft 7, there is provided a sleeve 16 adapted to co-rotate with the rotary table 6 (FIG. 3).

The sleeve 16 is carrying a rotary frame 17 including a circular bottom plate 18, a circular upper plate 18a and a plurality of side poles 19 extending upright from the bottom plate 18 towards the upper plate 18a.

At a portion extending between the lower and upper circular plates 18 and 18a, the fixed shaft 7 fixedly carries a first cam 20 and a second cam 21 as well as a third cam 22 mounted around the first cam 20. Furthermore, a reduced upper portion 7a of the fixed shaft 7 which is formed as a hollow shaft, carries a fourth cam 23 and a fifth cam 24.

The hollow shaft portion 7a is connected with a vacuum conduit 25, and is formed with a plurality of bores 27 communicating with a vacuum box 26 adapted to co-rotate with the upper plate 18a.

Furthermore, the device includes a sixth cam 28 mounted to a frame of the device at a position below the rotary table 6 and around the axis of the fixed shaft 7. Again referring to FIG. 1, a vacuum adhesion star rotor 29 is provided to the side of the feed rotor 5 adjacent the rotary frame 17. The star rotor 29 is carried by a shaft 29a (FIG. 5), which is also driven by electric motor 10 by way of the gear train.

The star rotor 29 is formed as a hollow structure, the inside of space of which is communicated to a source of vacuum by way of a branch pipe 25a connected to the vacuum pipe 25.

The star rotor 29 has a plurality of radially projected suction parts 30, each of which is adapted to take up each one of the tubular elements 31 of thermally contractive synthetic resin stored in the trough-like feeding means 32 in a flatly pressed and stacked condition, the feeding means 32 being adapted to index in synchronization with the rotation of the star rotor 29. In the shown embodiment, two feeding means 32 are provided to supply the tubular element 31 from each feeding means to respective alternate ones of the suction ports 30 of the star rotor.

As the star rotor 29 rotates, each suction port 30 which has taken up one of tubular element 31 comes to oppose a suction port 34 provided at a tip portion of a vacuum adhesion finger 33' mounted at a lower end of a tube 33 passed through the lower and upper plates 18 and 18a of the rotary frame 17 and 18a of the rotary frame 17 to be pivotally carried thereby.

The tube 33 is connected to vacuum box 26 by a connecting pipe 25b and applies such a vacuum at a suction port 34 which is a little higher than that applied to the suction port 30.

Thus, as the star rotor 29 rotates further, so that the suction port 30 which has once confronted with suction port 34 departs therefrom, the flat tubular element 31 is removed from the suction port 30 and attached to the suction port 34 of the finger 33'.

The rotary frame 17 carries another set of a plurality of tubes 33a extended through lower and upper plates 18 and 18a to be pivotally carried thereby, each of the tubes 33a carrying at the lower end thereof, a vacuum adhesion finger 33a' having a suction port 34a at the tip portion thereof.

The suction port 34a of the finger 33' is normally positioned above the suction port 34 of the finger 33' so that the suction port 34a does not abut the suction port 34 and to release the suction port 34 to free it for the operation to meet with the suction port 30 of the star rotor to receive the flat tubular element 31 from the star rotor. When the rotary frame 17 has rotated an angle from the above mentioned position, a swing arm 35 mounted at the upper end of the tube 33 is rotated a little by engagement with the fourth cam 23 to correspondingly rotate the finger 33a' a little around the axis of the tube 33a.

In this case, since the tubes 33 and 33a are rotatably engaged with each other by means of gears 36 and 36a meshed with each other, the former being firmly mounted to the tube 33 and the latter being firmly mounted to the tube 33a, the rotation of the tube 33a in one direction causes the corresponding rotation of the tube 33 in the other direction. The gear 36 has a relatively large width to allow a relative axial movement between the tube 33 and 33a in the following manner: When the rotary frame 17 has rotated in the above mentioned manner, it happens at the same time that a roller 37 mounted to the tube 33a disengaged from the third cam 22, thereby the tube 33a moves downwards and the suction port 34a provided at the lower level end of the tube 33a comes to the same level as the port 34 provided at the lower end of the tube 33 to confront with it with interposition of the flat tubular element 31.

In this condition, the opposite layers of the flatly pressed tubular element 31 are held by oppositely arranged suction ports 34 and 34a by vacuum suction force applied to the two ports.

Figure 14:
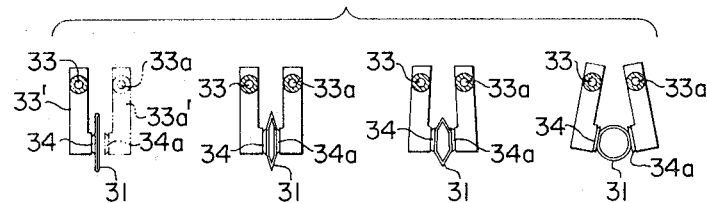
FIG. 14 shows the operation of the vacuum adhesion fingers to open the flatly pressed tubular element.

Then as the rotary frame 17 rotates further, the tube 33 is again rotated in the opposite direction by the co-operation of the swing arm 35 with the fourth cam 23, whereby the fingers 33' and 33a' are rotated in opposite direction around the axis of the tubes 33 and 33a, respectively, to have the suction ports 34 and 34a parted from each other while they are holding the opposite layers of the flatened tubular element 31. Thus, the tubular element 31 is opened in the manner as shown in FIG. 14.

When the tubular element 31 has been opened in the above mentioned manner, a guide rod 39 is inserted to positively hold the tubular element 31 in the opened condition. The guide rod 39 is mounted at the lower end of a rod 38 extended through the lower and upper plates 18 and 18a of the rotary frame to be pivotally supported thereby and is moved up and down in the following manner: The rod 38 carries a block 41 having a first roller 40 adapted to follow the second cam 21 and a second roller 40a adapted to engage in vertical groove 42 provided in the side pole 19 of the rotary frame 17. Thus, as the rotary frame 17 rotates, the roller 40 is raised or lowered by the cam 21, and accordingly, the rod 38 is moved up and down.

At a lower portion of the rod 38, there is loosely mounted a sleeve 43 which is also movably passed through the lower plate 18 of the rotary frame 17 and carries the pushing sleeve 44 at the lower end portion thereof. The sleeve 43 is carrying first and second rollers 45 and 45a at the upper end portion thereof, the first roller 45 engaging with the first cam 20 and the second roller 45a being guided through a second vertical groove 42a provided in the side pole 19. Thus, as the rotary frame 17 rotates, and in addition through the sleeve 43 the rod 38 and the guide rod 39 are moved up and down in the aforementioned manner.

Figure 6:
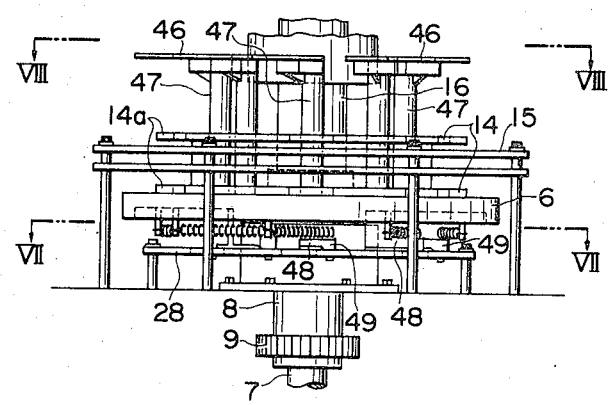
FIG. 6 is an elevational view showing a part of the device especially a structure including a rotary plate in an enlarged scale.
Figure 7:
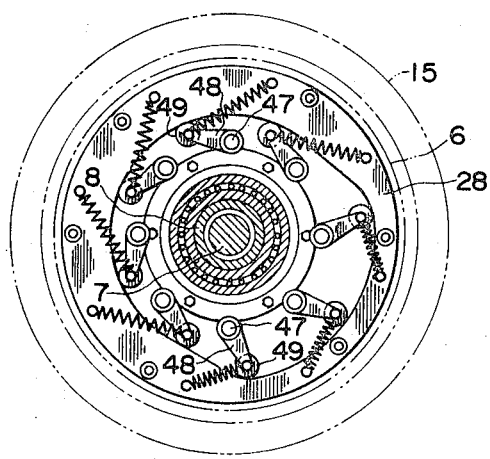
FIG. 7 is a view along line VII—VII in FIG. 6.
Figure 15:
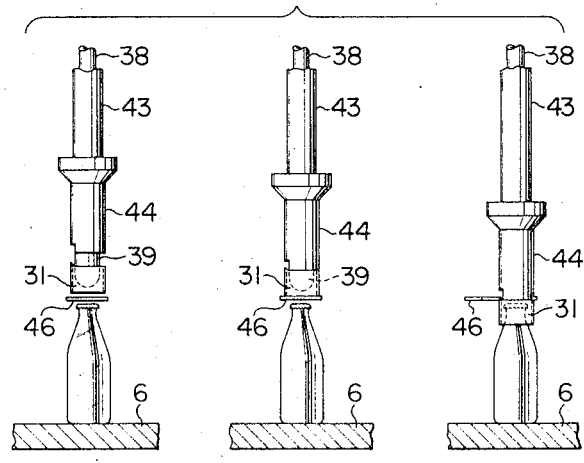
FIG. 15 shows the operation of the guide rod and pushing means to push the tubular element out of the guide rod toward a capped mouth portion of a bottle.

According to the operational sequence of the device, the guide rod 39 is first lowered to be inserted into the opened tubular element 31, and thereafter the sleeve 43 is lowered so that the lower end of the pushing sleeve 44 abut against the upper end of the tubular element 31 and pushes the same out of the guide rod 39 downwards and actually onto a cap mouth portion of the bottle just positioned thereunder, as shown FIG. 15. In this case, however, it is preferred that a stopper plate 46 is provided to be positioned just above the capped mouth portion of the bottle carried on the rotary table 6 as shown in FIG. 15 and in more detail in FIGS. 6–8. By the stopper plate 46, the tubular element 31 pushed downwards by the pushing sleeve 44 is once stopped correctly just above the capped mouth portion of the bottle, and thereafter the stopper plate 46 is shifted sidewards to allow further downwards movement of the tubular element 31 until it is correctly mounted onto the capped mouth portion of the bottles. The stopper plate 46 is carried by a shaft 47 extending downwards through the rotary table 6 and carrying an arm 48 at the lower end portion thereof.

The arm 48 is carrying a roller 49 at the free end thereof which is in following engagement with the sixth cam 28.

Figure 8:
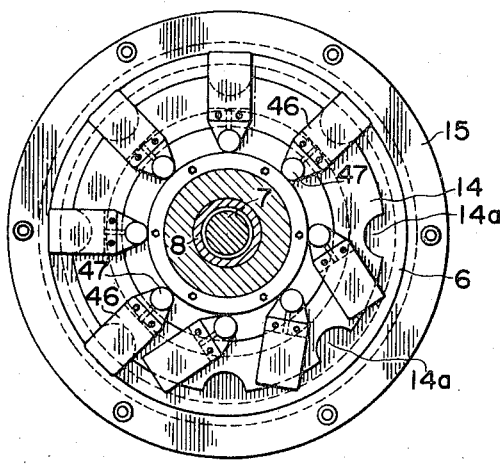
FIG. 8 is a view along line VIII—VIII in FIG. 6.
Figure 9:
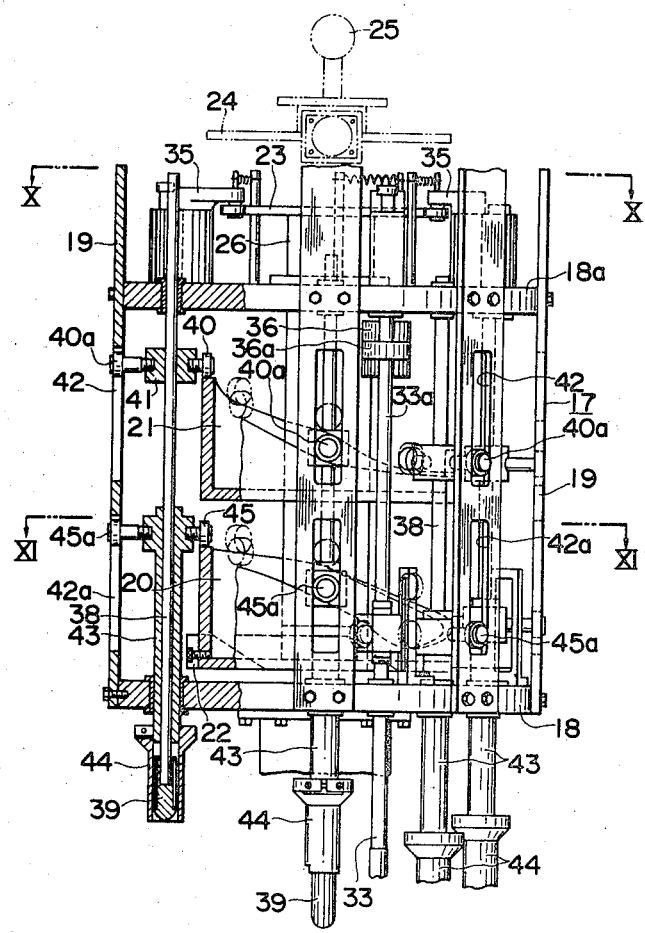
FIG. 9 is an elevational view showing still another part of device, especially the structure including a rotary frame, is an enlarged scale.
Figure 10:
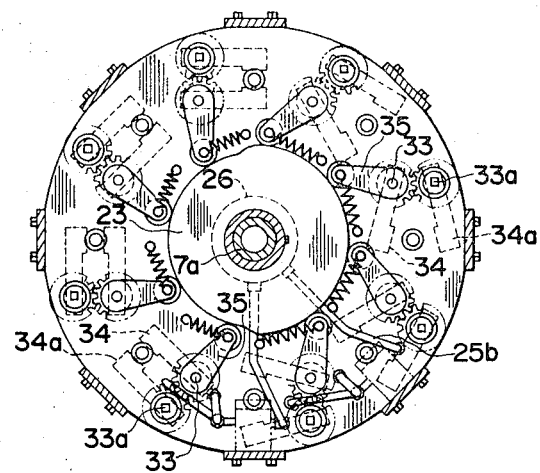
FIG. 10 is a view along line X—X in FIG. 9.
Figure 11:
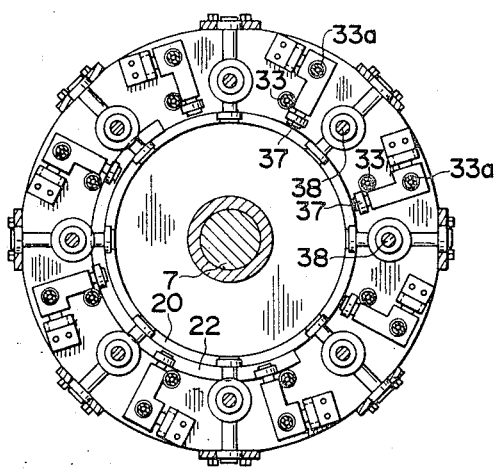
FIG. 11 is a view along line XI—XI in FIG. 9.
Figure 12:
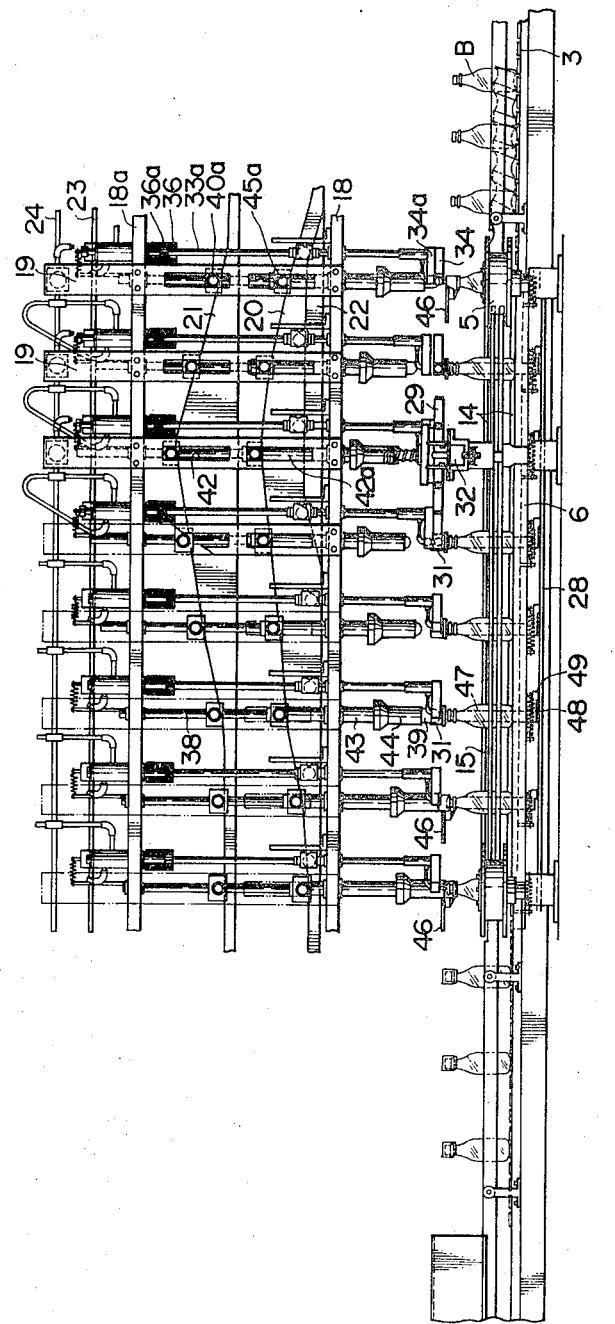
FIG. 12 shows a series of operation of the device in a view developed around the rotary frame.

Thus, as the rotary table 6 rotates, the arm 48 is rotated at the proper sequential position by the engagement of the roller 49 with sixth cam 28 and the stopper plate 46 is rotated around the axis of the shaft 47 to clear the downwards passage of the tubular element 31 towards a bottle held in the notched portion 14 as shown in FIG. 8.

The bottles provided with the tubular elements 31 are caught in notched portions 50a of a take-out rotor 50 and are again transferred to the conveyer 3 and are fed into a heating furnace 51.

In the heating furnace, the tubular element 31 made of thermally contractive synthetic resin is heated to contract it and fit it firmly around the capped mouth portion of the bottle to provide a tight cap sealing means. Thereafter, the bottles are transferred onto a rotary table 52.

The fifth cam 24 is to control the application of the vacuum to the tube 33a to have the suction port 34a operated effectively only in a required sequential period.

Figure 13:
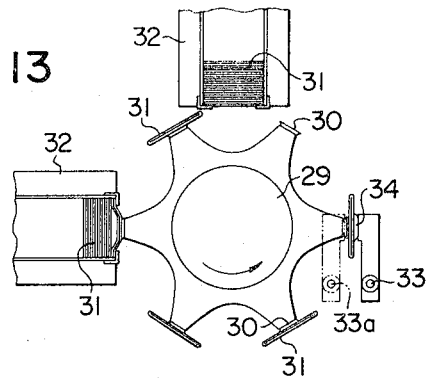
FIG. 13 is a view showing the operation of the star rotor in more detail.

Summarizing the operation of the device according to this invention, the tubular elements 31 are stored in the trough like feeding means 32 in a flatly pressed and stacked condition including more than 1,000 pieces in one stack and are taken out one by one by the rotating star rotor 29 by being held at the suction port 30 of the star rotor by vacuum adhesion (FIG. 13). The tubular element 31 held by one of the suction ports 30' is brought to meet with the suction port 34 provided at the lower end portion of one of the tubes 33 mounted to the rotary frame 17 and is transfered to the suction port 34 to be carried thereby by the same vacuum adhesion. Then, as the rotary frame 17 rotates, another suction port 34a provided at the lower end of one of another set of tubes 33a is lowered to confront the suction port 34 and holds the opposite face of the tubular element 31 also by the same vacuum adhesion, so that the opposite layers of the flatly pressed tubular element are separately held by the suction ports 34 and 34a, respectively. Then, the suction ports 34 and 34a are parted slightly from each other, thereby the tubular element 31 is opened (FIG. 14). Then, one of the guide rods 39 each being carried by one of the rods 38 vertically movably carried by the rotary frame 17 is inserted into the opened tubular element 31 (FIG. 15), and thereafter, the pushing sleeve 44 provided around the guide rod 39 is lowered to push the tubular element 31 out of the guide rod 39 downward until the tubular element 31 is provisionally held by the stopper plate 46 positioned thereunder.

By being provisionally held by the stopper plate 46, the tubular element is positioned correctly so that the axis thereof aligns with the axis of the bottle positioned thereunder by being carried by the rotary table 6 corotating with the rotary frame 17.

Then, as the rotary frame 17 as well as the rotary table 6 rotate further, the stopper plate 46 swings sidewards to clear the passage for the downwards movement of the tubular element which is caused by a further downward movement of the pushing sleeve 44 and the tubular element is mounted onto the capped mouth portion of the bottle positioned thereunder.

Each bottle thus mounted with a tubular element at the capped mouth portion thereof is then fed into the heating furnace 51 where the tubular element is thermally contracted.

What I claim is:

1. In an automatic cap sealing device which includes:

means for conveying bottles serially along a path which includes an arcuate portion;

dispensing means for serially dispensing flattened tubular sealing elements of thermally contractile synthetic resin material;

means for applying a tubular sealing element to the mouth portion of each bottle as each bottle passes through said arcuate portion of said path;

means for serially withdrawing flattened tubular sealing elements from the dispensing means and for transfering the withdrawn elements to said applying means, the improvement wherein said applying means comprises:

a rotary member having a plurality of angularly spaced first vacuum adhesion fingers positioned on said rotary member to be successively carried into contact with flattened tubular sealing elements withdrawn from the dispensing means by said serially withdrawing means; vacuum conduit means successively communicating with each first vacuum adhesion finger to cause that finger to grip one outer side of the flattened tubular sealing element when carried into contact therewith; the first vacuum adhesion members also being positioned to be successively carried by rotation of said rotary member, after each has successively gripped a flattened tubular sealing element, into vertical alignment above a respective bottle in said arcuate portion of said path;

a second vacuum adhesion finger opposingly paired with each first vacuum adhesion finger and carried by said rotary member;

cam means timed with rotation of the rotary member for successively displacing each second vacuum adhesion finger from confronting opposition with the respective first vacuum adhesion member while the respective first vacuum adhesion member is being carried into contact with and gripping one outer side of a flattened tubular sealing element, and for permitting return of the respective second vacuum adhesion member to confronting opposition with the respective first vacuum adhesion member after the respective first vacuum adhesion member has gripped one outer side of a flattened tubular sealing element and is nearing vertical alignment with a respective bottle passing through said arcuate portion of said path; means for then urging each respective second vacuum adhesion member into contact with the opposite outer side of the respective flattened tubular sealing element;

vacuum conduit means for successively communicating with each second vacuum adhesion finger when each finger is urged into contact with the opposite outer side of a respective flattened tubular sealing element;

means for urging the first and second vacuum adhesion fingers of each successive pair relatively away from one another to open the respective flattened tubular sealing element gripped thereby as that tubular sealing element further nears vertical alignment with a respective bottle passing through said arcuate portion of said path;

and downward pushing means positioned to push each respective opened tubular sealing element down onto the mouth portion of the respective bottle when that opened tubular sealing element is in vertical alignment with the respective bottle in said arcuate portion of said path.

2. The improvement of claim 1, the applying means further including:

stop element means mounted a fixed distance above the mouth portions of the bottles in said arcuate portion of said path;

guide rod means mounted for vertical reciprocation through the opened tubular sealing member to receive the opened tubular sealing member from the respective pair of vacuum adhesion members;

means for moving the stop element means horizontally into a blocking position between said opened tubular sealing element and the mouth portion of the bottle which is to be sealed thereby, during an initial part of the downward push provided by said downward pushing means, whereby said opened tubular sealing element is stopped mid-descent, causing the lower extent thereof to have a uniform vertical spatial position on said guide rod means relative to the bottle which is to be sealed, means for then moving the stop element out of said blocking position, so that the downward pushing means may complete the downward push to remove the opened tubular sealing element from the guide rod means and to install the opened tubular sealing element on the bottle mouth portion.

* * * * *